United States Patent
Byström et al.

(10) Patent No.: US 8,009,309 B2
(45) Date of Patent: Aug. 30, 2011

(54) METHOD AND SYSTEM FOR IDENTIFYING PRINT JOBS ASSOCIATED WITH AN IMAGE FORMATION DEVICE

(75) Inventors: Tomas Byström, London (GB); Thomas Chase, Welwyn Garden City (GB); Dean Lynn, Ware (GB); Satyan Vadher, Middlesex (GB); Andy Jordan, Harpenden (GB)

(73) Assignee: Xerox Corporation, Norwalk, CT (US)

( * ) Notice: Subject to any disclaimer, the term of this patent is extended or adjusted under 35 U.S.C. 154(b) by 1489 days.

(21) Appl. No.: 11/292,126

(22) Filed: Dec. 1, 2005

(65) Prior Publication Data
US 2007/0127049 A1    Jun. 7, 2007

(51) Int. Cl.
*G06F 3/12* (2006.01)
(52) U.S. Cl. .................................... 358/1.15
(58) Field of Classification Search .............. 358/1.15, 358/1.13; 707/200, 822
See application file for complete search history.

(56) References Cited

U.S. PATENT DOCUMENTS

| | | | |
|---|---|---|---|
| 6,052,198 A * | 4/2000 | Neuhard et al. | 358/1.15 |
| 6,600,569 B1 * | 7/2003 | Osada et al. | 358/1.12 |
| 2001/0035982 A1 | 11/2001 | Otsubo et al. | |

OTHER PUBLICATIONS

Various Authors, ".bat file to remove part of a file name", Jan. 3, 2005, http://www.codingforums.com/archive/index.php/t-49688.html.*

* cited by examiner

*Primary Examiner* — Benny Tieu
*Assistant Examiner* — Jeremiah Bryar
(74) *Attorney, Agent, or Firm* — Fay Sharpe LLP (57) ABSTRACT

A method of processing print jobs that improves the ability of users to identify their print lobs at the local user interface of an image formation device is provided. The method includes receiving image data for a print job at a computer and converting the image data to page description language code at the computer. The page description language code for the image data includes a job name string having an application name portion and a filename portion. The method further includes comparing the application name portion of the job name string to a list of application names in a database; removing the application name portion from the job name string where the application name portion is found in the database; and then sending the page description language code for the image data to an image formation device.

12 Claims, 6 Drawing Sheets

METHOD AND SYSTEM FOR IDENTIFYING PRINT JOBS ASSOCIATED WITH AN IMAGE FORMATION DEVICE

BACKGROUND

This exemplary embodiment relates generally to electrophotographic technology, and in particular relates to a method and system for processing print jobs via an image formation device.

Documents displayed on an image processing device (e.g., a personal computer, workstation or the like) connected to a network are typically converted to a page description language (PDL), such as Adobe PostScript, Adobe PDF, or Hewlett-Packard PCL (Printer Command Language), before being sent to a color printer, fax machine, photocopier, or other image formation device, which forms images using electrophotographic technology. The image formation device connected to the network interprets sent PDL, generates raster data of resolution suitable for the resolution of the printer and finally prints an image on paper or other suitable media. The name of the document print job (i.e., the Job Name) on the queue display of most office image formation devices is in the form of Application Name—File Name. An example of this would be Microsoft Word—MyTestProject.doc. Since the local user interface (UI) on most office machines has limited space, the File Name may end up truncated such that only the Application Name would be displayed in its entirety. This makes it more difficult to identify the job, especially if many jobs have been submitted and they are all queued up on the same machine.

Figure 1:
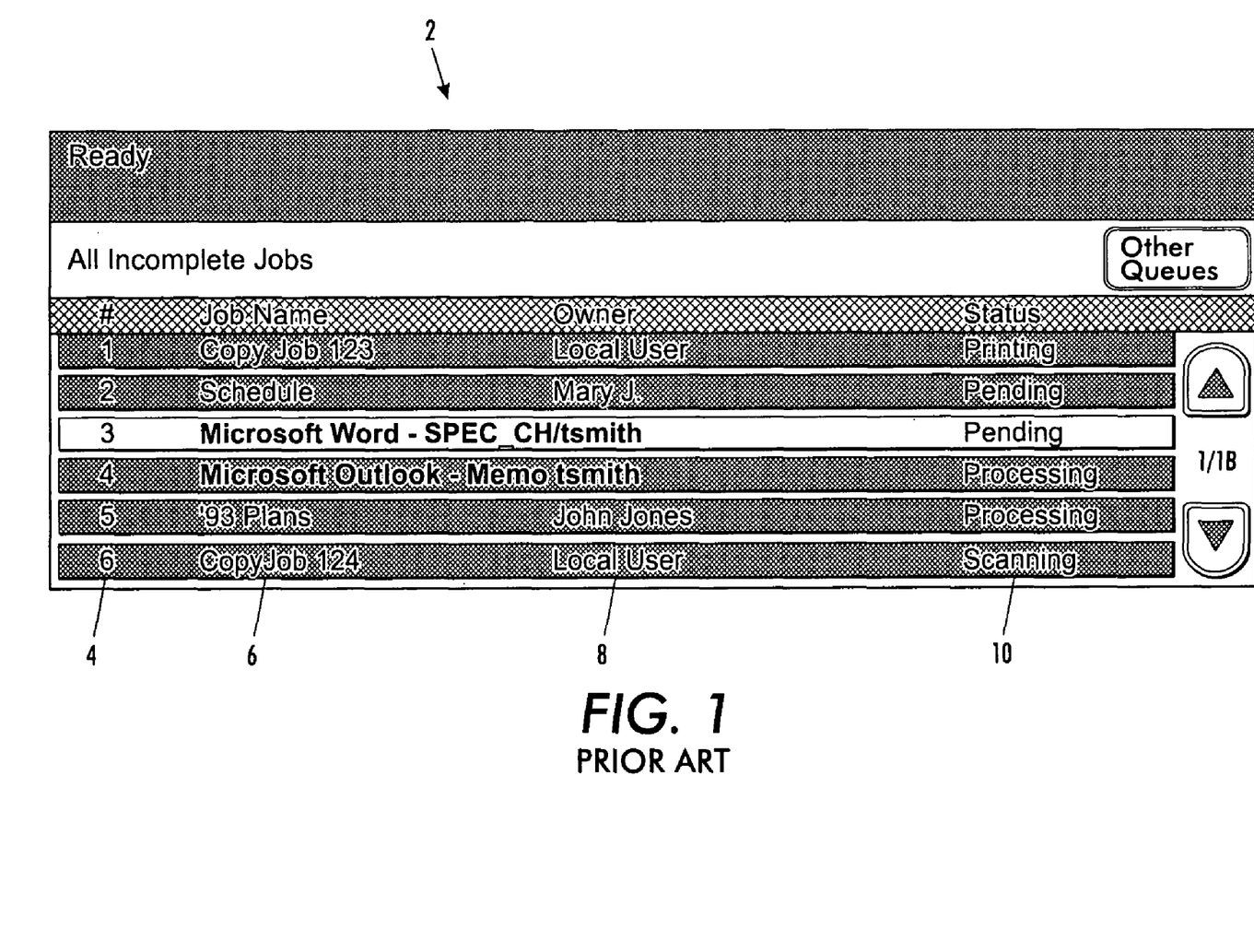
FIG. 1 is a screen shot of a prior art print job queue display.

For example, FIG. 1, is a screen shot of a typical prior art print job queue display 2 on a local user interface. The queue display 2 may include a job number column 4, a job name column 6, a job owner column 8, and a job status column 10. As shown in FIG. 1, the full name of the filename is not included.

Thus, there is a need for a method and system for improving the ability of users to identify their print jobs at the local user interface of an image formation device.

BRIEF DESCRIPTION

In one aspect of the exemplary embodiment, a method of processing print jobs is provided. The method comprises receiving image data for a print job at a computer; converting the image data to page description language code at the computer, wherein the page description language code for the image data includes a job name string having an application name portion and a filename portion; comparing the application name portion of the job name string to a list of application names in a database; removing the application name portion from the job name string where the application name portion is found in the database; and sending the page description language code for the image data to an image formation device.

In another aspect of the exemplary embodiment, an alternative method of processing print jobs is provided. The method comprises receiving image data for a print job at a computer; converting the image data to page description language code, wherein the page description language code for the image data includes a job name string having an application name portion and a filename portion; sending the page description language code for the image data to an image formation device; comparing the application name portion of the job name string to a list of application names in a database; and removing the application name portion from the job name string where the application name portion is found in the database.

In yet another aspect of the exemplary embodiment, an image forming system is provided. The system comprises an image formation device; and a computer programmed to: receive image data for a print job; convert the image data to page description language code, wherein the page description language code for the image data includes a job name string having an application name portion and a filename portion; compare the application name portion of the job name string to a list of application names in a database; remove the application name portion from the job name string where the application name portion is found in the database; and send the page description language code for the image data to the image formation device.

In yet another aspect of the exemplary embodiment, an alternative image forming system is provided. This system comprises a computer; and an image formation device operative to: receive image data for a print job in page description language from the computer, wherein the page description language code for the image data includes a job name string having an application name portion and a filename portion; compare the application name portion of the job name string to a list of application names in a database; and remove the application name portion from the job name string where the application name portion is found in the database.

The page description language may comprise PostScript, PCL or PDF. Further, the image formation device may comprise a xerographic printer or other printing device such as ink or solid ink printing devices.

DETAILED DESCRIPTION

Figure 2:
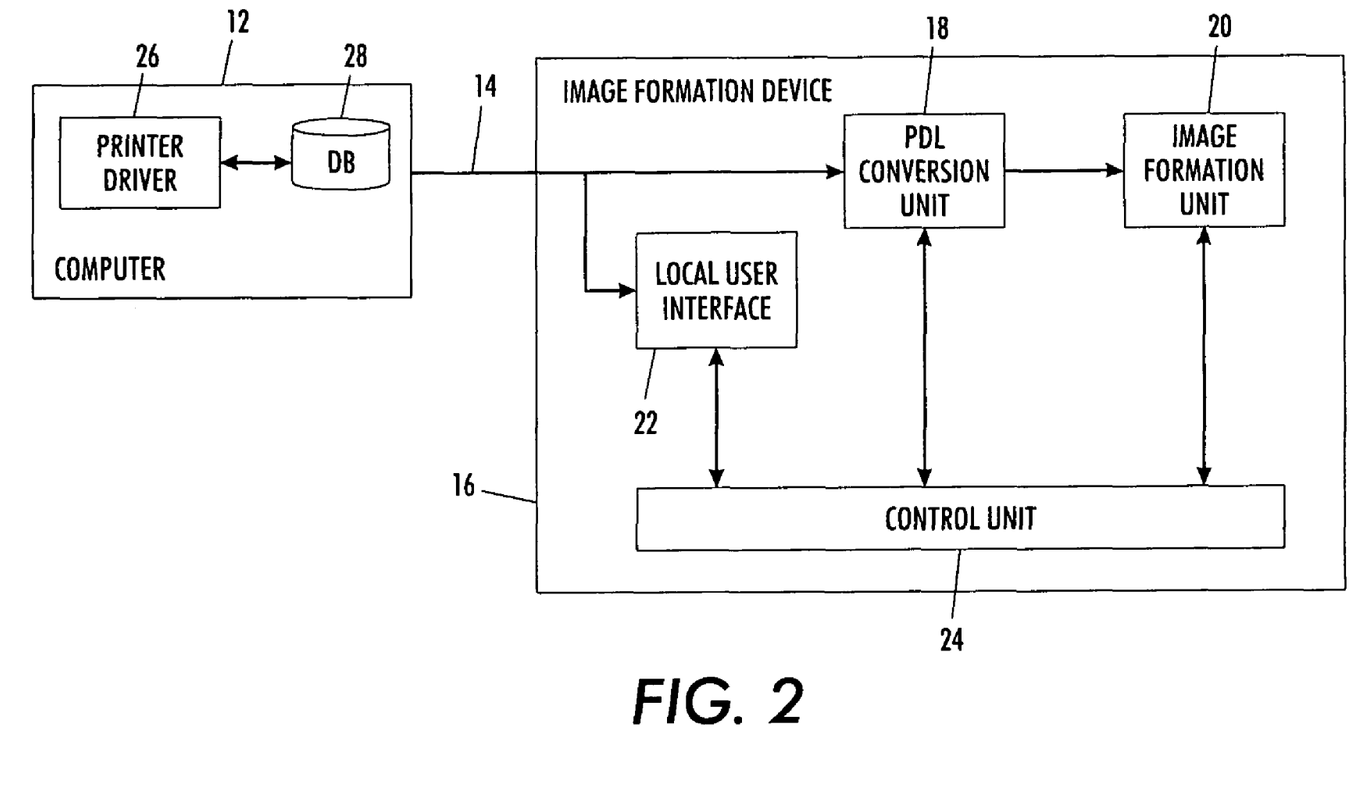
FIG. 2 is a block diagram showing an example of an image formation device including one embodiment of an image processor according to the exemplary embodiment.

FIG. 2 is a block diagram showing an example of an image formation device including one embodiment of an image processor according to the exemplary embodiment. As shown in FIG. 2, a reference number 12 denotes a computer, 14 denotes a telecommunication line, 16 denotes an image formation device such as a xerographic or electrophotographic printer or other printing devices such as ink or solid ink printing devices, 18 denotes a page description language (PDL) conversion unit, 20 denotes an image formation unit, 22 denotes a local user interface, and 24 denotes a control unit. In this example, the image processor according to the exemplary embodiment is provided in the image formation device 16.

The computer 12 represents image data to be printed by the image formation device 16 in PDL and outputs it to the image formation device 16 via the telecommunication line 14. The telecommunication line 14 may also be a computer network such as LAN and a public line or a WAN and may also be directly connected by a cable.

The image formation device 16 includes the PDL conversion unit 18, the image formation unit 20, the local user interface 22, the control unit 24 and others. The PDL conversion unit 18 converts image data described in PDL sent from the computer 12 to output image data and outputs it. The PDL conversion unit 18 converts PDL to a raster image, for example, and can output it to the image formation unit 20. The image formation unit 20 forms an image on suitable media (e.g., paper), based upon output image data converted by the PDL conversion unit 18. The control unit 24 controls the operation of the whole image formation device 16.

The computer 12 includes a printer driver 26, which is a piece of software that converts the data to be printed to the form specific to the image formation device 16. The purpose of the printer driver 26 is to allow applications to do printing without being aware of the technical details of each type of image formation device. For example, PostScript printer drivers create a file that is accepted by PostScript printers, Hewlett-Packard (HP) printer drivers create PCL files and so on. Drivers for Windows-only printers rasterize the pages (RIP function) and send the actual bit patterns to the printer, which are applied to the drum by the laser or LED array. Most image formation devices contain only a single PDL, but some can support multiple PDLs, usually by means of an escape sequence that informs the printer which PDL mode to use. The computer 12 also includes a database 28 for storing various data, including a list of known application strings. The database 28 could also be hard coded on the image formation device 16.

Figure 3:
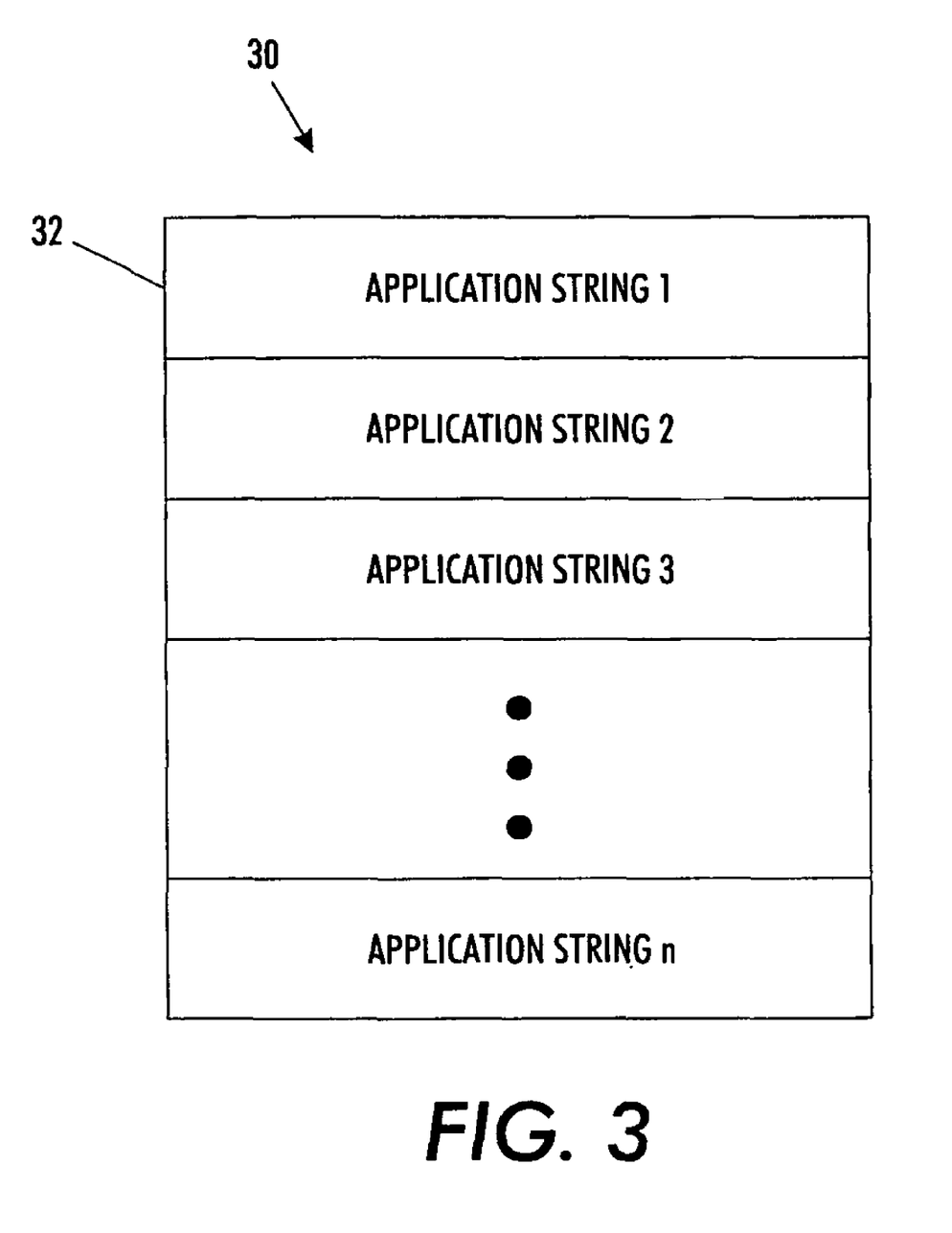
FIG. 3 is a memory layout of data stored in the database in accordance with an aspect of the exemplary embodiment.

The database 28 includes a number of data sub-blocks. These are shown in FIG. 3. They are shown as a super block 30, not all of whose fields are filled. The super block 30, as known in the art, can be accessed from the identity of any one of several fields in the super block 30. The super block 30 includes any number of data sub-blocks 32, each of which contains a known application string. Of course, additional sub-blocks may be provided in the super block 30 for storing other types of data useful in implementing the application name truncation method described below. For example, the file extension (e.g., .doc, .xls, .ppt, etc.) may be stripped out as well. Thus, there may be a sub-block for the known file extensions.

As stated earlier, the printer driver 26 converts the image to a PDL, such as PostScript or PCL. PostScript is a page description language optimized for printing graphics and text (whether on paper, film, or CRT is immaterial). The main purpose of PostScript is to provide a convenient language in which to describe images in a device independent manner. This device independence means that the image is described without reference to any specific device features (e.g. printer resolution) so that the same description could be used on any PostScript printer (say, a LaserWriter or a Linotron) without modification. The language itself, which is typically interpreted, is stack-based in the same manner as an RPN calculator. A program pushes arguments to an operator onto a stack and then invokes the operator. Typically, the operator will have some result which is left at the top of the stack. PCL is the page description language for HP LaserJet printers. It has become a de facto standard used in many printers and typesetters.

In the first example below, there is an illustration of the PDL code for a Microsoft Word document as received from a PostScript printer driver 26, wherein the line with the Application Name is in bold:

```
_%-12345X@PJL JOB
@PJL ENTER LANGUAGE = POSTSCRIPT
%!PS-Adobe-3.0
%%XRXbegin
%%OID_ATT_JOB_OWNER "y6N122DR";
% %OID_ATT_JOB_NAME "Microsoft Word - Document2";
%%OID_ATT_START_SHEET OID__VAL_JOB_SHEET_FULL;
%%OID_ATT_JOB_TYPE OID_VAL_JOB TYPE_PRINT;
%%XRXend
%%XRXDriverBuildVer: 4.90.38.0U 2004.08.20
%%XRXProdDllVer: 4.90.38.0U 2004.08.20
%%XRXToolkitDllVer: 4.108.32.I00U 2004.08.20
%%XRXBaseDllVer: 0.3.1282.1
%!PS-Adobe-3.0
%%Title: Microsoft Word - Document2
%%Creator: PScript5.dll Version 5.2
%%CreationDate: 11/19/2004 11:34:40
%%For: y6N122DR
;%%BoundmgBox: (atend)
%%Pages: (atend)
%%Orientation: Portrait
```

In the second example below, there is an illustration of the PDL code for a Microsoft Word document as received from the PCL printer driver 26, wherein the line with the Application Name is in bold:

```
_%-12345X@PJL JOB
@PJL SET COPIBS=I
@PJL SET DENSITY=4
@PJL SET JOBOFFSET=ON
@PJL COMMENT XRXbegin
@PJL COMMENT
OID_ATT_OUTPUT OID_VAL_QUTPUT_PAGE__COLLATE;
@PJL COMMENT
OID__ATT_FINISHING OID_VAL_GENERIC_NONE;
@PJL COMMENT OID _ ATT _ JOB _OWNER "y6N122DR";
@PJL COMMENT OID_ATT_JOB_NAME "Microsoft Word -
Document2";
@PJL COMMENT
OID_ATT_START_SHEET OID_VAL_JOB_SHEET_FULL;
@PJL COMMENT
OID_ATT_JOB_TYPE OID VAL_JOB_TYPE_PRINT;
@PJL COMMENT OID__ATT_DEFAULT_MEDIUM_TYPE "System-
Default";
@PJL COMMENT OID_ATT_DEFAULT_MEDIUM_COLOUR
"White"[11];
@PJL COMMENT
OID_ATT_PRINT_QUALITY_OID_VAL_PRINT_.QALITY_NORMAL;
@PJL COMMENT OID_ATT_PUNCH 0;
@PJL COMMENT XRXend
@PJL COMMENT DriverBuildVer: 4.90.38.OU 2004.08.20
@PJL COMMENT ProdDllVer: 4.90.3S.0U 2004.08.20
@PJL COMMENT ToolkitDllVer: 4.108.32.100U 2004.08.20
```

In both examples above, OID_ATT_JOB_NAME is used to identify the Job Name string and includes the application and document title (or filename). Thus, in the case of a Microsoft Word application, the application name may initially take up to 16 characters, which leaves only about 12 characters for the document name. Since it is becoming more and more common to use longer filenames for document names, in many cases, the operator would not be able to see the full name of the document on the local user interface 22. In general, the same holds true for other applications such as PowerPoint, although it is to be understood that the PDL code, and thus the application strings, for various other applications may vary from the examples shown above.

Figure 4:
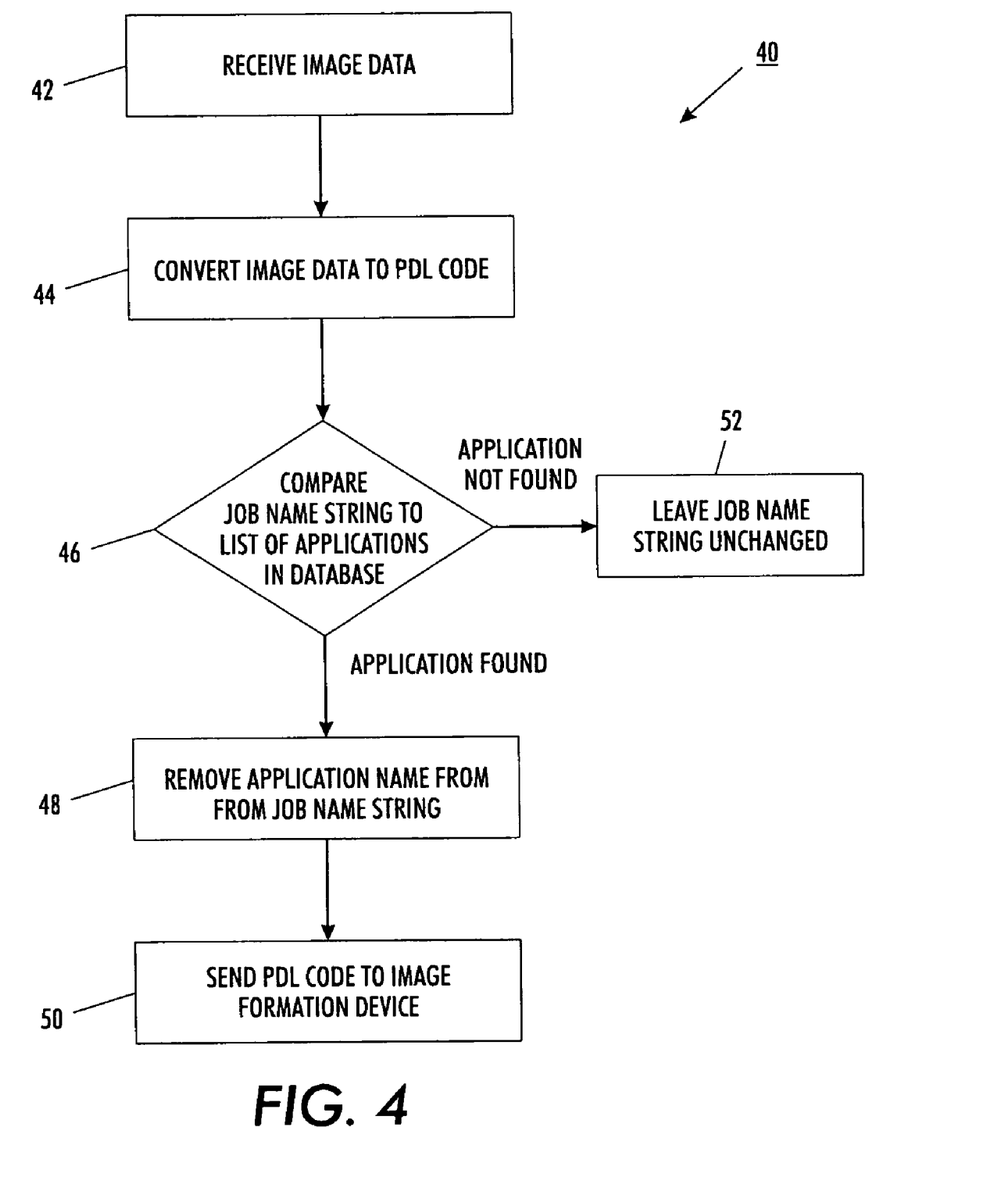
FIG. 4 is flow chart outlining a method for processing a print job according to the exemplary embodiment

FIG. 4 shows a method 40 for processing a print job so that the user may view the entire Job Name in the queue. Initially, the computer 12 receives image data from a user (i.e., a print job) (42). Next, the printer driver 26 converts the image data to any of the known PDL codes (44). The PDL code includes a Job Name string. The printer driver 26 then compares the Job Name string (e.g., OID_ATT_JOB_NAME in the examples above) to a known list of application strings in the database 28 (46). If a match is found, then the printer driver 26 cuts the application name from the Job Name string (48). For example, in PostScript the entire Job Name string might read: % % OID_ATT_JOB_NAME "Document2", thus leaving room for a greater amount of characters for the Document Name.

The PDL code is then sent to the image formation device 16 (50) If no match is found, then the Job Name string is unchanged (52), and the PDL code is sent to the image formation device 16 as is.

Figure 5:
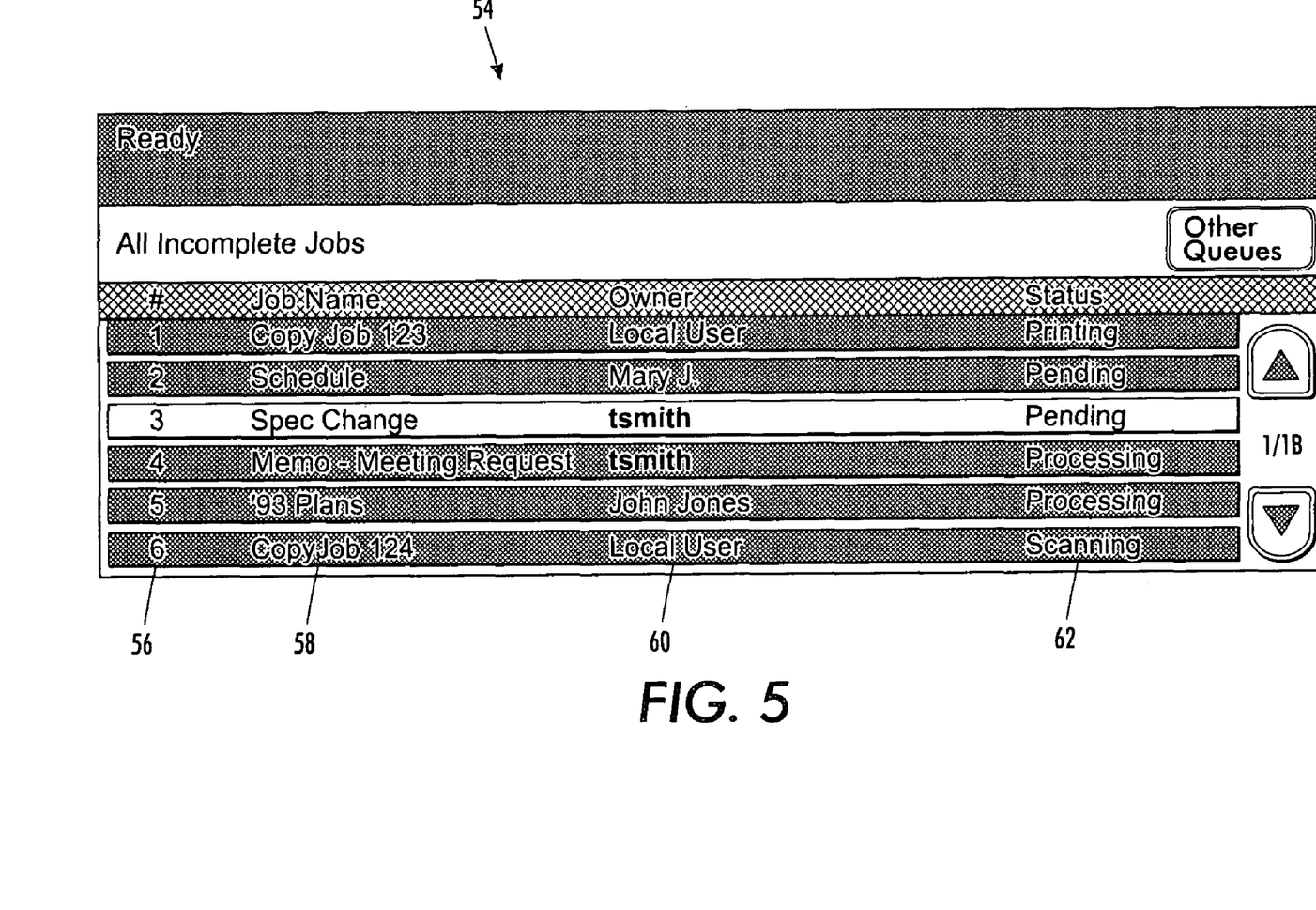
FIG. 5 is a screen shot of a print job queue display after implementing the method outlined in FIG. 3.

To illustrate, FIG. 5, is a screen shot of a queue display 54 on the local user interface 22. As shown, the queue display 54 includes a job number column 56, a job name column 58, a job owner column 60, and a job status column 62. Of course, it is to be understood that not all of these columns may be include in the queue display and/or additional columns may be included. As shown in FIG. 5, the full name of the filename is included in the job name column 58.

It is possible to change the application list in two ways. For example, the list could be modified by the user from the printer driver 26. Optionally, the printer driver 26 would allow the user to configure the list of known application names that is stored in the database 28. This would be done either by a text file that would simply list the application names or via the user interface of the computer 12 that would make it possible to enter the name that the user would like to filter. This would make it possible to add new application names or to add lesser known applications. Additionally, the application list could be hard coded in the printer driver 26 by the manufacturer. The hard coded version would only be altered if the manufacturer would release a new or updated printer driver 26.

Figure 6:
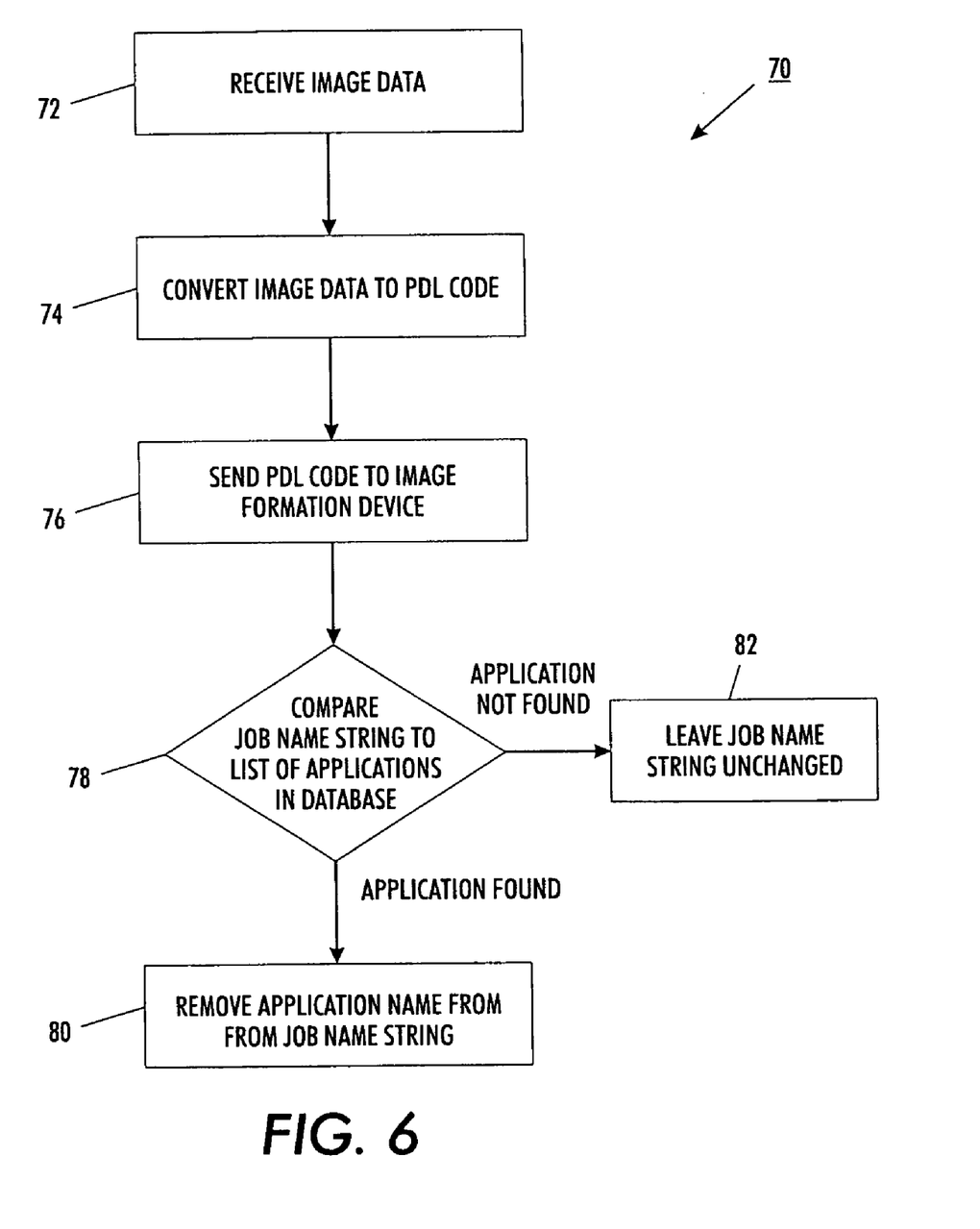
FIG. 6 is flow chart outlining an alternative method for processing a print job.

Alternatively, the method described above may be implemented via the image formation device 16. In that case, it would have to reside in firmware or on the hard drive (not shown) typically found in the image formation device 16. For example, FIG. 6 shows an example of another method 70 for processing a print job so that the user may view the entire Job Name in the queue. Initially, the computer 12 receives image data from a user (i.e., a print job) (72). Next, the printer driver 26 converts the image data to any of the known PDL codes (74). The PDL code includes a Job Name string. The PDL code is then sent to the image formation device 16 (76). The image formation device 16 then compares the Job Name string to a known list of application strings stored in a database (78). If a match is found, then the image formation device 16 cuts the application name from the Job Name string (80), leaving room for a greater amount of characters for the Document Name. However, if no match is found, then the Job Name string is unchanged (82). In either case, print job is processed in the usual manner.

The application list could be modified via a web-interface. The user could be connected to the web-interface (via an Internet browser such as Microsoft Internet Explorer or Mozilla Firefox, for example) and alter the application list on-line.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   receiving image data for a print job at a computer;
   converting the image data to page description language code at the computer, wherein the page description language code for the image data includes a job name string having an application name portion and a filename portion;
   comparing the application name portion of the job name string to a list of application names in a database;
   removing the application name portion from the job name string where the application name portion is found in the database; and
   sending the page description language code for the image data to an image formation device.

2. The method defined in claim 1, wherein the page description language comprises PostScript, PCL or PDF.

3. The method defined in claim 1, wherein the image formation device comprises a xerographic printer.

4. A method comprising:
   receiving image data for a print job at a computer;
   converting the image data to page description language code, wherein the page description language code for the image data includes a job name string having an application name portion and a filename portion;
   sending the page description language code for the image data to an image formation device;
   comparing the application name portion of the job name string to a list of application names in a database; and
   removing the application name portion from the job name string where the application name portion is found in the database.

5. The method defined in claim 4, wherein the page description language comprises PostScript, PCL or PDF.

6. The method defined in claim 4, wherein the image formation device comprises a xerographic printer.

7. An image forming system comprising:
   an image formation device; and
   a computer programmed to:
   receive image data for a print job;
   convert the image data to page description language code, wherein the page description language code for the image data includes a job name string having an application name portion and a filename portion;
   compare the application name portion of the job name string to a list of application names in a database;
   remove the application name portion from the job name string where the application name portion is found in the database; and
   send the page description language code for the image data to the image formation device.

8. The system defined in claim 7, wherein the page description language comprises PostScript, PCL or PDF.

9. The system defined in claim 7, wherein the image formation device comprises a xerographic printer.

10. A system comprising:
    a computer; and
    an image formation device operative to:
    receive image data for a print job in page description language from the computer, wherein the page description language code for the image data includes a job name string having an application name portion and a filename portion;
    compare the application name portion of the job name string to a list of application names in a database; and remove the application name portion from the job name string where the application name portion is found in the database.

11. The system defined in claim 10, wherein the page description language comprises PostScript, PCL or PDF.

12. The system defined in claim 10, wherein the image formation device comprises a xerographic printer.

* * * * *